United States Patent
Takeo

(10) Patent No.: US 9,461,988 B2
(45) Date of Patent: Oct. 4, 2016

(54) IMAGE FORMING APPARATUS CAPABLE OF EXECUTING AUTHENTICATION PROCESSING, METHOD OF CONTROLLING THE SAME, AND STORAGE MEDIUM

(71) Applicant: CANON KABUSHIKI KAISHA, Tokyo (JP)

(72) Inventor: Akinori Takeo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/694,484

(22) Filed: Apr. 23, 2015

(65) Prior Publication Data

US 2015/0229634 A1    Aug. 13, 2015

Related U.S. Application Data

(63) Continuation of application No. 14/188,975, filed on Feb. 25, 2014, now Pat. No. 9,041,946.

(30) Foreign Application Priority Data

Feb. 25, 2013    (JP) .................................. 2013-034814

(51) Int. Cl.
*G06F 3/12* (2006.01)
*H04N 1/00* (2006.01)
(Continued)

(52) U.S. Cl.
CPC ........... *H04L 63/083* (2013.01); *G06F 3/1222* (2013.01); *G06F 3/1238* (2013.01); *G06F 21/31* (2013.01); *G06F 21/45* (2013.01); *G06F 21/608* (2013.01); *H04L 63/10* (2013.01);
(Continued)

(58) Field of Classification Search
None
See application file for complete search history.

(56) References Cited

U.S. PATENT DOCUMENTS 7,003,667 B1 * 2/2006 Slick ..................... G06F 21/608
                                                            380/243
7,535,586 B2    5/2009 Kumashio
(Continued)

FOREIGN PATENT DOCUMENTS

CN          1601577 A       3/2005
CN        102098404 A       6/2011
(Continued)

OTHER PUBLICATIONS

Extended European Search Report issued in EP14155778.5 mailed Jun. 26, 2014.
(Continued)

*Primary Examiner* — Ming Hon
(74) *Attorney, Agent, or Firm* — Rossi, Kimms & McDowell LLP

(57) ABSTRACT

An image forming apparatus that is capable of executing authentication processing improved in security of a command including authentication information, which is received over a network from an external apparatus. A CPU receives a command including authentication information via a network. The CPU determines whether or not authentication information included in the received command is a hash value. The CPU causes processing in accordance with the received command to be executed depending on authentication performed based on the authentication information when it is determined that the authentication information is a hash value, and causes the processing not to be executed when it is determined that the authentication information is not a hash value.

9 Claims, 7 Drawing Sheets

(51) Int. Cl.
*G06F 21/45* (2013.01)
*H04L 29/06* (2006.01)
*G06F 21/31* (2013.01)
*G06F 21/60* (2013.01)
*H04N 1/44* (2006.01)

(52) U.S. Cl.
CPC .......... *H04N1/00854* (2013.01); *H04N 1/444* (2013.01); *H04N 1/4413* (2013.01)

(56) References Cited

U.S. PATENT DOCUMENTS

| | | | |
|---|---|---|---|
| 7,686,525 B2* | 3/2010 | Uchida | G06F 3/1218 399/75 |
| 8,151,344 B1* | 4/2012 | Channakeshava | H04L 9/3226 713/168 |
| 2002/0026538 A1 | 2/2002 | Takeo et al. | |
| 2004/0184064 A1* | 9/2004 | TaKeda et al. | G06F 21/608 358/1.13 |
| 2006/0005044 A1* | 1/2006 | Uchikawa | H04L 63/0428 713/189 |
| 2006/0279761 A1* | 12/2006 | Wang | G06F 21/608 358/1.14 |
| 2006/0293765 A1* | 12/2006 | Tanaka | H04N 1/00408 700/15 |
| 2008/0094667 A1* | 4/2008 | Kodaira | H04N 1/00408 358/442 |
| 2008/0301225 A1* | 12/2008 | Kamura | G06F 21/53 709/203 |
| 2009/0174900 A1 | 7/2009 | Shigehisa et al. | |
| 2009/0244596 A1* | 10/2009 | Katano | G06F 21/608 358/1.15 |
| 2009/0262391 A1* | 10/2009 | Suto | G06F 21/84 358/1.15 |
| 2010/0293608 A1* | 11/2010 | Schechter | G06F 17/2785 726/8 |
| 2011/0026066 A1 | 2/2011 | Akita et al. | |
| 2011/0134453 A1* | 6/2011 | Sakiyama | G06F 17/30861 358/1.13 |
| 2012/0144471 A1 | 6/2012 | Tsang et al. | |
| 2013/0050737 A1* | 2/2013 | Ichikawa | G06F 3/1206 358/1.14 |
| 2013/0182288 A1* | 7/2013 | Nakamura | G03G 15/5083 358/1.15 |
| 2015/0248258 A1* | 9/2015 | Ding | G06F 3/1222 358/1.15 |

FOREIGN PATENT DOCUMENTS

| | | |
|---|---|---|
| EP | 1517507 A1 | 3/2005 |
| JP | 2004213534 A | 7/2004 |

OTHER PUBLICATIONS

Murphy et al., "iSeries Telnet Enhancements <draft-murphy-iser-telnet-04.txt>", Internet Draft, Apr. 10, 2006, pp. 1-45, No. 4, IBM. XP015044999, ISSN: 0000-0004.

Non-Final Office Action issued in parent U.S. Appl. No. 14/188,975, dated Oct. 21, 2014.

Notice of Allowance issued in parent U.S. Appl. No. 14/188,975, dated Jan. 26, 2015.

Dffice Action issued in Chinese Appln. No. 201410064635.8 mailed Mar. 7, 2016. English translation provided.

* cited by examiner

FIG. 4A

| | | |
|---|---|---|
| 401 | Header ID | 0xabcd |
| 402 | Version | 0x10 |
| 403 | Authentication Mode | True |
| 404 | Operation Code | JobStart |
| 405 | Parameter Length | 0x0123 |
| 406 | User ID | 0x0000000000000000 |
| 407 | Password | 0x0000000000000000 |
| 408 | Attribute Count | 5 |
| 409 | Attribute 1 | AuthenticationInformation.UserID=0x12345678<br>AuthenticationInformation.Hash=0x1234abcd |
| 410 | Attribute 2 | JobPassword.Hash=0x012345abc |
| | .... | .... |
| 411 | Attribute 5 | JobName = "WRITTEN REPORT" |

FIG. 4B

| | | |
|---|---|---|
| 501 | Header ID | 0xabcd |
| 502 | Version | 0x10 |
| 503 | Authentication Mode | False |
| 504 | Operation Code | Set |
| 505 | Parameter Length | 0x0012 |
| 506 | User ID | 0x12345678 |
| 507 | Password | 0xabcd1234 |
| 508 | Attribute | Department Management = Enable |

IMAGE FORMING APPARATUS CAPABLE OF EXECUTING AUTHENTICATION PROCESSING, METHOD OF CONTROLLING THE SAME, AND STORAGE MEDIUM

BACKGROUND OF THE INVENTION

1. Field of the Invention

The present invention relates to an image forming apparatus that is capable of executing authentication processing, a method of controlling the same, and a storage medium.

2. Description of the Related Art

A digital multifunction peripheral is conventionally known which executes jobs, such as print jobs, scan jobs, document storage jobs, and facsimile transmission jobs, according to commands received from external apparatuses via a network. Further, a technique is also conventionally known in which an operation mode of the digital multifunction peripheral is set or changed according to a command received from an external apparatus via the network.

The above-mentioned commands sometimes include secret information, such as a password associated with a user or a section, and a password associated with a job. When the digital multifunction peripheral has received a command including a password, it performs authentication based on the received password. If authentication is successful, the digital multifunction peripheral permits execution of processing in accordance with the received command, whereas if authentication fails, the digital multifunction peripheral interprets the command as an error without executing the processing.

By the way, conventionally, there has been proposed a method of performing authentication in the following manner: In a system in which a server authenticates clients, first, an authentication method permitted to be used by a client is set in advance, and the client determines whether or not an authentication method which the client intends to use when exchanging authentication information with the server via a network is the permitted authentication method. If the authentication method which the client intends to use is not the permitted authentication method, the client does not execute exchanging of the authentication information with the server, and terminates the authentication attempt as an error.

For example, in Japanese Patent Laid-Open Publication No. 2004-213534, when transmitting a mail using SMTP, the following processing is performed: If an SMTP authentication method intended to be used between a client and a mail server to which the mail is to be transmitted is permitted, mail transmission is executed, whereas if not, mail transmission is handled as an error without performing SMTP authentication.

However, according to the conventional techniques, the image forming apparatus cannot permit or reject processing in accordance with a command received from an external apparatus and including authentication information, by considering whether or not the command has been transmitted and received in a proper form.

SUMMARY OF THE INVENTION

The present invention provides an image forming apparatus that is capable of executing authentication processing improved in security of a command including authentication information and received over a network from an external apparatus, a method of controlling the same, and a storage medium.

In a first aspect of the present invention, there is provided an image forming apparatus comprising a reception unit configured to receive a command including authentication information via a network, a determination unit configured to determine whether or not the authentication information included in the command received by the reception unit is a hash value, and a control unit configured to cause, in a case where it is determined by the determination unit that the authentication information is a hash value, processing in accordance with the received command to be executed depending on authentication performed based on the authentication information, and cause, in a case where it is determined by the determination unit that the authentication information is not a hash value, the processing in accordance with the received command not to be executed.

In a second aspect of the present invention, there is provided a method of controlling an image forming apparatus comprising receiving a command including authentication information via a network, determining whether or not the authentication information included in the command received by said receiving is a hash value, and causing, in a case where it is determined by said determining that the authentication information is a hash value, processing in accordance with the received command to be executed depending on authentication performed based on the authentication information, and causing, in a case where it is determined by said determining that the authentication information is not a hash value, the processing in accordance with the received command not to be executed.

In a third aspect of the present invention, there is provided a non-transitory computer-readable storage medium storing a computer-executable program for causing a computer to execute a method of controlling an image forming apparatus, wherein the method comprises receiving a command including authentication information via a network, determining whether or not the authentication information included in the command received by said receiving is a hash value, and causing, in a case where it is determined by said determining that the authentication information is a hash value, processing in accordance with the received command to be executed depending on authentication performed based on the authentication information, and causing, in a case where it is determined by said determining that the authentication information is not a hash value, the processing in accordance with the received command not to be executed.

According to the present invention, it is possible to provide an image forming apparatus that is capable of executing authentication processing improved in security of a command including authentication information and received over a network from an external apparatus, a method of controlling the same, and a storage medium.

Further features of the present invention will become apparent from the following description of exemplary embodiments with reference to the attached drawings.

BRIEF DESCRIPTION OF THE DRAWINGS

FIGS. 4A and 4B are diagrams each showing the format of a command transmitted from a PC to the MFP, appearing in FIG. 1.

DESCRIPTION OF THE EMBODIMENTS

The present invention will now be described in detail below with reference to the accompanying drawings showing embodiments thereof.

Figure 1:
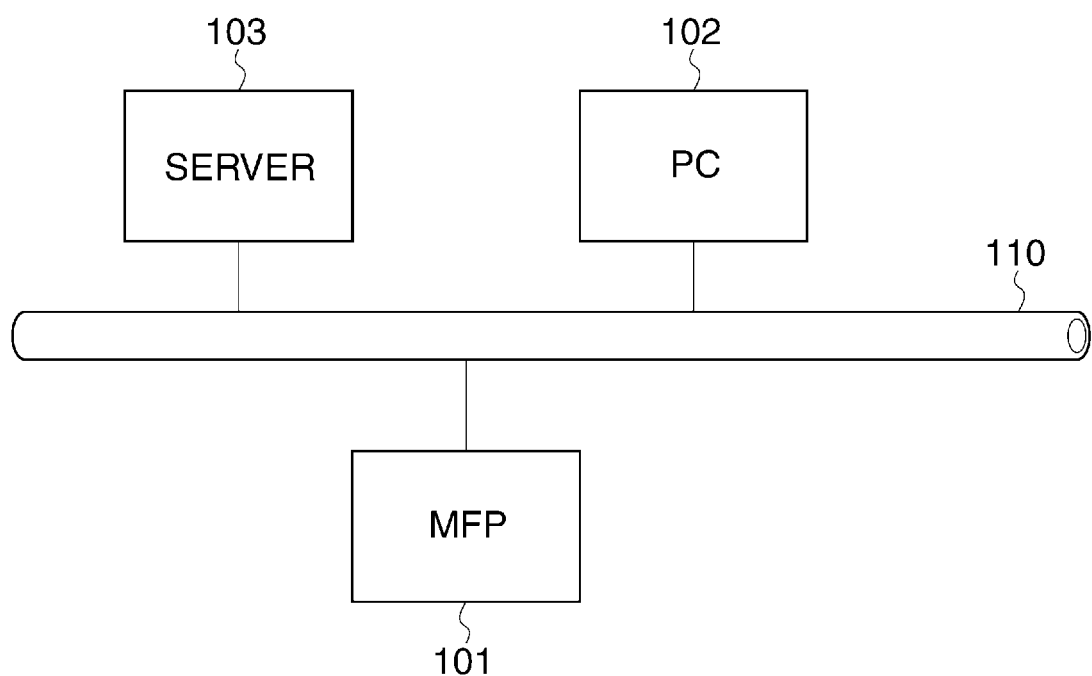
FIG. 1 is a schematic diagram of a network system including an image forming apparatus according to an embodiment of the present invention.

FIG. 1 is a schematic diagram of a network system 100 including a MFP (multifunction peripheral) as an image forming apparatus according to an embodiment of the present invention.

Referring to FIG. 1, the network system 100 comprises the MFP, denoted by reference numeral 101, a PC 102, and a server 103, which are connected to a network 110.

The MFP 101 includes a scanner and a printer. The PC 102 as an information processing apparatus which is an external apparatus is capable of requesting the MFP 101 to execute processing, using a command, described hereinafter, and performing state management of the MFP 101 or the PC 102, and management of a job being executed using a command, such as a scan job, a print job, and a copy job. As described above, the MFP 101 is an image forming apparatus that executes processing in accordance with a received command.

The server 103 is a settings management server and is capable of sending a setting in response to a setting acquisition request from the MFP 101 or the PC 102.

Figure 2:
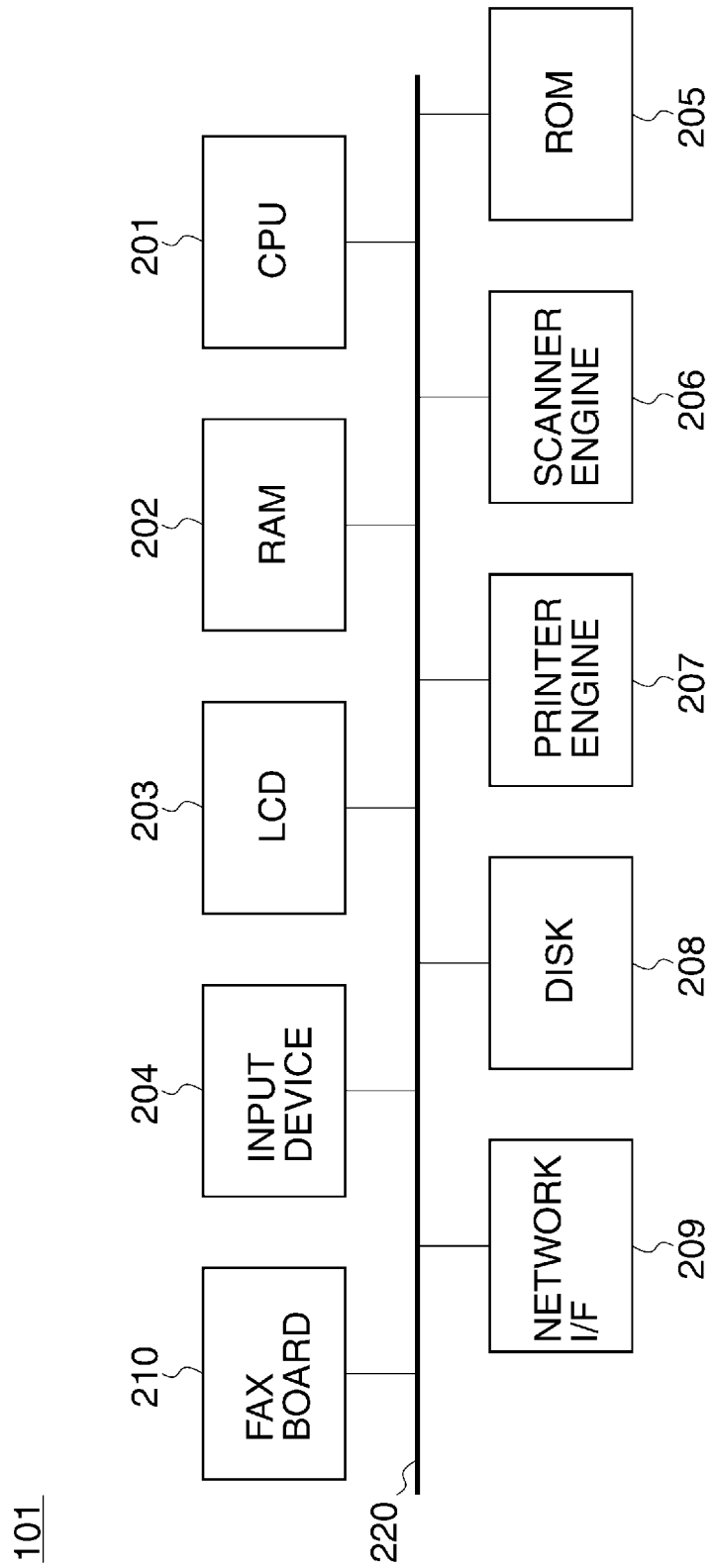
FIG. 2 is a schematic block diagram of an MFP appearing in FIG. 1.

FIG. 2 is a schematic block diagram of the MFP 101 appearing in FIG. 1.

Referring to FIG. 2, the MFP 101 comprises a CPU 201, a RAM 202, an LCD 203, an input device 204, a FAX board 210, a ROM 205, a scanner engine 206, a printer engine 207, a disk 208, and a network interface 209, which are connected to a system bus 220.

The CPU 201 controls the overall operation of the MFP 101. The ROM 205 stores a program for controlling the MFP 101, etc. The program etc. stored in the ROM 205 are loaded into the RAM 202, and the RAM 202 is also used as a work area for the CPU 201.

The disk 208 stores attribute information indicative of functions and a status of each job which is executed by the MFP 101, print data, and so forth.

The LCD 203 displays information to a user. The input device 204 is used by the user for performing inputting operations. The FAX board 210 is used for performing facsimile communication.

The printer engine 207 prints an image on a recording sheet or the like. The scanner engine 206 reads an original, and generates image data representative of the original.

The network interface 209 is for connecting to the network 110. The MFP 101 may include other interfaces compatible with USB, IEEE1394, Bluetooth, and so forth.

With the above-described configuration, the CPU 201 performs communication with the external apparatus (PC 102) connected to the network 100 via the network interface 209, receives a command for performing a print operation, managing the image forming apparatus (MFP 101), or the like, stores the received command in the RAM 202, and executes processing in accordance with the received command.

Figure 3:
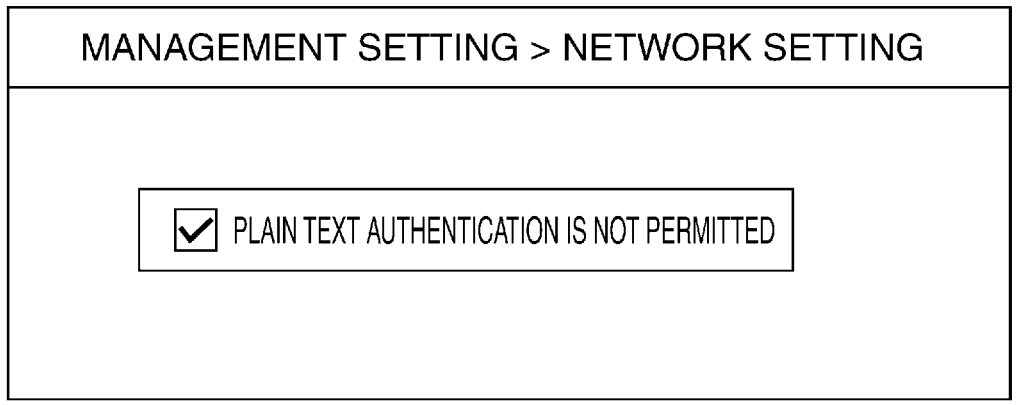
FIG. 3 is a diagram showing an example of a setting screen displayed on an LCD appearing in FIG. 2.

FIG. 3 is a diagram showing an example of a setting screen displayed on the LCD 203 appearing in FIG. 2.

The setting screen shown in FIG. 3 is a screen for causing the user to set whether or not to permit the MFP 101 to exchange authentication information which is not concealed, with the PC 102 and the server 103 via the network interface 209.

Note that the authentication information includes a password used for section authentication or user authentication, a password of a secure job, which is required to be input when executing printing, a password which is set in association with an F code in facsimile transmission, and so forth. In the following description, exchange of authentication information which is not concealed is referred to as plain text authentication.

A person who is allowed to make a setting on the above-mentioned setting screen is an administrator of the MFP 101, and the setting made on this setting screen is stored in the disk 208. In FIG. 3, if a checkmark is entered in a checkbox of "plain text authentication is not permitted", this indicates that plain text authentication is not permitted, whereas if a checkmark is not entered in the checkbox, this indicates that plain text authentication is permitted.

FIGS. 4A and 4B are diagrams each showing the format of a command transmitted from the PC 102 to the MFP 101, appearing in FIG. 1.

FIG. 4A shows the format of a job input command. The job input command is formed by a fixed-length header section (401 to 407) and a parameter section (408 to 411).

Note that a job in the present embodiment indicates processing which is executed by the MFP 101, such as printing, scanning, copying, facsimile transmission/reception, print data storage, and print data transmission. Therefore, the job input command is a command for causing the MFP 101 to execute any of these.

In the present embodiment, some job input commands include a password as authentication information. For example, in the case of the print job, a secure print job includes a password. The secure print job is a job for printing print data by receiving a job input command including the print data provided with a password, from an external apparatus, and having the password input from a console section of the MFP 101 by the user. That is, the password included in the command for inputting the secure print job can be said to be a password required to cause the printer engine 207 of the MFP 101 to print the print data. The secure print job is also sometimes referred to as a reservation print job or an authentication print job.

A print job that includes a section ID and a section password may be mentioned as another example. This type of print job is a job in which the number of copies is managed for each section ID included in the print job. The print job including a section ID and a section password is subjected to section authentication based on the section ID and the section password when the job is input to the MFP 101, and if the section authentication is successful, printing is started, whereas if the section authentication fails, printing is not executed. That is, the section password included in this type of print job is also a password required to cause the printer engine 207 of the MFP 101 to perform printing, similarly to the password included in the secure print job.

A scan job including a section ID and a section password may be mentioned as a still another example. This is similar to the above-mentioned print job including a section ID and a section password, but is distinguished therefrom in that section authentication is executed when the scanner is caused to read an original.

As described above, in the present embodiment, the MFP 101 can execute a job, such as a print job, a scan job, a copy job, a facsimile transmission/reception job, and a print data storage job, and the job input commands for executing these jobs sometimes include the above-described authentication information.

Further, other examples of the job input command including authentication information include one for inputting a facsimile transmission job including an F code password, one including a password used for accessing a storage area (also referred to as a BOX) for storing print data, and so forth.

In FIG. 4A, Header ID 401 is an ID for identifying a command system, and is set to a value of 0xabcd in FIG. 4A. Note that Header ID 501 of a device management command, described hereinafter, has the same value, and a command type can be determined based on Operation Code 404, referred to hereinafter, for processing.

Version 402 is a value indicative of a version of the command system. In FIG. 4A, Version 402 is set to a value of 0x10, which indicates a version 1.0 of the command system.

Authentication Mode 403 represents indication as to whether to perform authentication determination by using User ID 406 and Password 407 included in the header section or using authentication information attributes included in the parameter section. If Authentication Mode 403 is True, this indicates that authentication determination is to be performed using not User ID 406 and Password 407 but the authentication information attributes included in the parameter section. Although described hereinafter, in the present embodiment, the value (password) of each authentication information attribute is a hash value, and if Authentication Mode 403 is True, the CPU 201 determines to execute authentication processing using the password described as the hash value.

On the other hand, if Authentication Mode 403 is False, this indicates that authentication determination is to be performed using User ID 406 and Password 407. In the present embodiment, Password 407 used for authentication processing in a case where Authentication Mode 403 is False has a possibility of being described in plain text. Therefore, a command having Authentication Mode 403 which is False is rejected except a specific case. This will be described in detail with reference to FIGS. 5 and 6.

Note that when a job input command is transmitted from a printer driver or a client application of the PC 101, which supports only plain text authentication, Authentication Mode 403 is always False.

Operation Code 404 indicates a value for identifying a command type. In FIG. 4A, Operation Code 404 indicates that the command is a JobStart command. The JobStart command is a command which is transmitted when execution of a job is requested and is to be subjected to authentication processing before execution of the job.

Parameter Length 405 indicates data length of the parameter section in terms of the number of bytes. User ID 406 indicates a user identifier used for authentication processing of the JobStart command in the case where Authentication Mode 403 is False. The Password 407 indicates a password used for authentication processing of the JobStart command in the case where Authentication Mode 403 is False.

Attribute Count 408 indicates the number of attributes designated within the JobStart command. In FIG. 4A, Attribute Count 408 indicates a value of 5, and hence the JobStart command has five attributes.

Attribute 1 (409) indicates a first attribute, and in the illustrated example in FIG. 4A, Attribute 1 indicates that a user identifier as an authentication information attribute is "0x12345678", and a hash value calculated from an associated password is "0x1234abcd".

If Authentication Mode 403 is True, authentication is performed based on the user identifier of the authentication information attribute and the hash value calculated from the associated password, which are indicated in Attribute 1 (409).

Attribute 2 (410) indicates a second attribute, and indicates that a hash value calculated from the job password required to execute the print job is "0x012345abc".

Then, Attribute 3 and Attribute 4 follow Attribute 2, but are omitted in this example. Attribute 5 (411) indicates that a Job Name is "written report".

FIG. 4B shows the format of the device management command. The device management command is formed by a fixed-length header section (501 to 507) and a parameter section 508. The device management command is a command for managing the MFP 101. For example, the device management command is used for configuring settings of an operation of the MFP 101, and changing the settings. In a case where the device management command is a command which is permitted to be input only by an administrator of the MFP 101, it sometimes includes an administrator ID and an administrator password of the administrator as authentication information.

In the description of FIG. 4B, description of items having the same contents as those described with reference to FIG. 4A is omitted.

Referring to FIG. 4B, Authentication Mode 503 is False. In this case, authentication determination is performed using User ID 506 and Password 507.

Further, Operation Code 504 indicates a Set command for setting an attribute of the MFP 101. Further, User ID 506 indicates "0x12345678", and Password 507 indicates that "0xabcd1234" is a password associated with User ID 506. Attribute 508 indicates that an attribute setting for enabling the section management is to be performed.

The above-described job input command and device management command are received not only from the PC 102, but also by calling an internal API (application programming interface) by an application operating on the MFP 101.

The above-described job input command and device management command both include a user ID and a password (or a hash value thereof) which are authentication information for authenticating a user.

Figure 5:
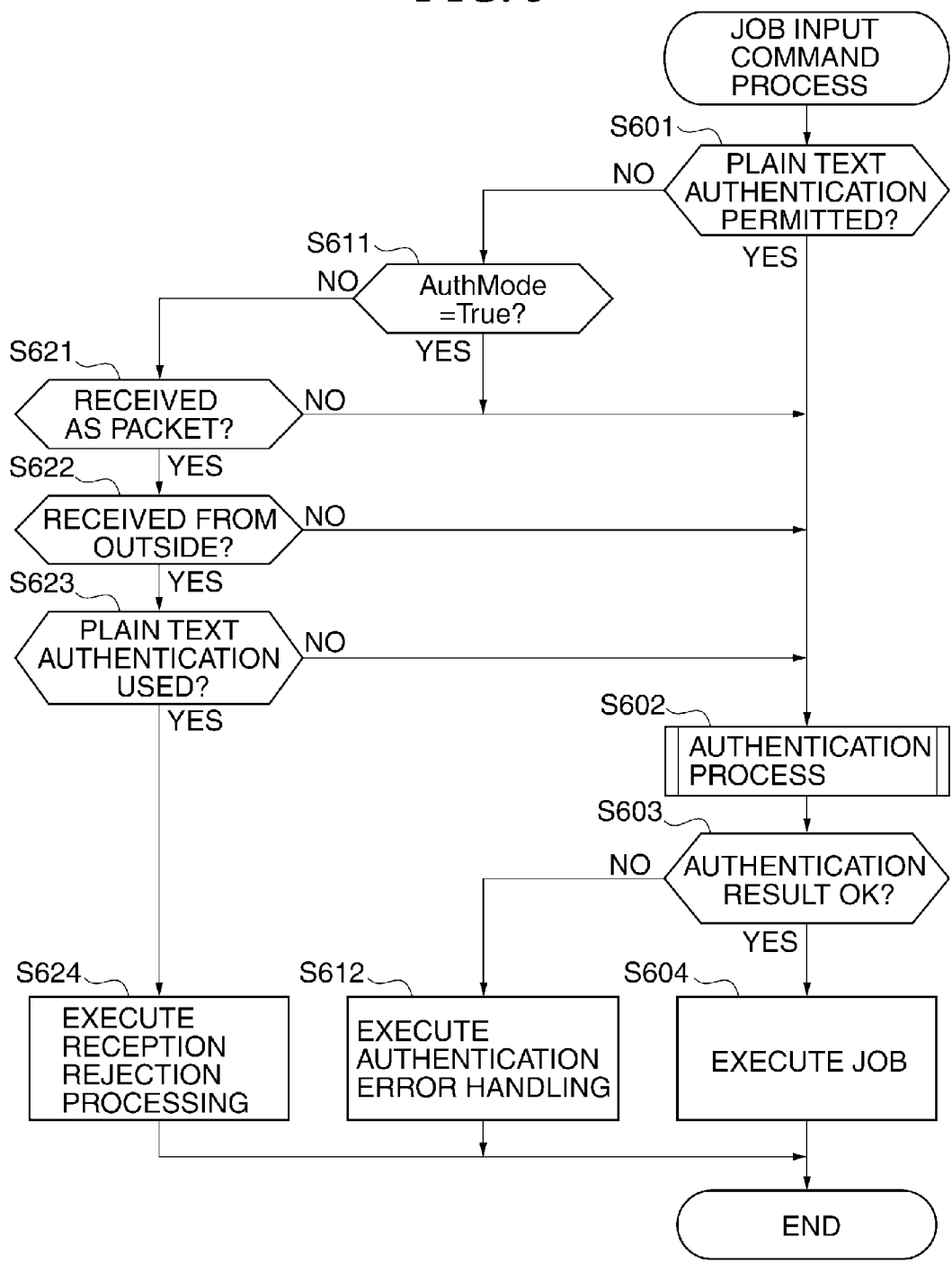
FIG. 5 is a flowchart of a job input command process executed by a CPU appearing in FIG. 2.

FIG. 5 is a flowchart of a job input command process executed by the CPU 201 appearing in FIG. 2 when a job input command is received.

Referring to FIG. 5, when the CPU 201 receives a job input command, the CPU 201 determines whether or not plain text authentication is permitted (step S601). This can be determined based on the setting described with reference to FIG. 3.

If it is determined in the step S601 that plain text authentication is permitted (YES to the step S601), the CPU 201 performs an authentication process (step S602), and determines whether or not the authentication result is OK (step S603).

If it is determined in the step S603 that the authentication result is OK (YES to the step S603), the CPU 201 executes the requested job, and notifies a sender of the command of the success of the job input command process (step S604), followed by terminating the present process.

On the other hand, if it is determined in the step S603 that the authentication result is not OK (NO to the step S603), this means that the authentication has failed, and hence the CPU 201 notifies, without executing the job, the sender of the command that the job input command process has failed due to an authentication error (step S612), followed by terminating the present process.

Referring again to the step S601, if it is determined in the step S601 that plain text authentication is not permitted (NO to the step S601), the CPU 201 determines whether or not Authentication Mode 403, described with reference to FIG. 4A, is True (step S611).

If it is determined in the step S611 that Authentication Mode 403 is True (YES to the step S611), the CPU 201 proceeds to the step S602. Thus, when the possibility of the use of plain text authentication is excluded by the command, user authentication is performed.

On the other hand, if it is determined in the step S611 that Authentication Mode 403 is False (NO to the step S611), the CPU 201 determines whether or not the job input command has been received as a packet an example of which is shown in FIG. 4A (step S621).

If it is determined in the step S621 that the job input command has not been received as a packet (NO to the step S621), the CPU 201 proceeds to the step S602. Note that when the command has not been received as a packet, this means that the command has been issued by calling the above-mentioned internal API.

On the other hand, if it is determined in the step S621 that the job input command has been received as a packet (YES to the step S621), the CPU 201 determines whether or not the job input command has been transmitted from the outside of the MFP 101 and has been received via the network interface 209 (step S622). In doing this, for example, an IP address of the sender of the job input command is checked, and if the IP address of the sender is a local loopback address (127.0.0.1), it is determined that the job input command has been transmitted from the inside of the MFP 101.

If it is determined in the step S622 that the job input command has not been transmitted from the outside of the MFP 101 (NO to the step S622), the CPU 201 proceeds to the step S602.

On the other hand, if it is determined in the step S622 that the job input command has been transmitted from the outside of the MFP 101 (YES to the step S622), the CPU 201 determines whether or not the received command uses plain text authentication (step S623). In the step S623, if a hash value of a password is included in the command, it is determined that the command is not a command transmitted in plain text. Whether or not a hash value is included in the command may be determined based on whether or not the value of Attribute 1 (409) indicates an effective value. For example, it may be determined that an effective value is indicated when a value other than 0 is set as the value of Attribute 1 (409).

If it is determined in the step S623 that the job input command does not use plain text authentication (NO to the step S623), i.e. if the job input command designates a user ID and a password using a hash value or an encrypted value, the CPU 201 proceeds to the step S602.

On the other hand, if it is determined in the step S623 that the job input command uses plain text authentication (YES to the step S623), the command using plain text authentication has been transmitted from the outside, and hence the CPU 201 executes reception rejection processing (step S624), followed by terminating the present process.

The reception rejection processing refers to processing executed, as a response to the received job input command, for sending an error notification indicative of access rejection, handling the job input command as an error job, or executing the like processing, and then entering a job history record to the effect that the use of unpermitted plain text authentication was attempted, in the job history stored in the disk 208 of the MFP 101.

According to the job input command process in FIG. 5, if it is determined that user authentication using authentication information in a command written in plain text is not permitted, also if it is determined that the command has been received from an external apparatus, and also if it is determined that the authentication information in the command is in plain text, reception of the command is rejected, and hence it is possible to suppress user authentication using plain text, which makes it possible to improve security of commands which include authentication information, received from an external apparatus over a network.

Figure 6:
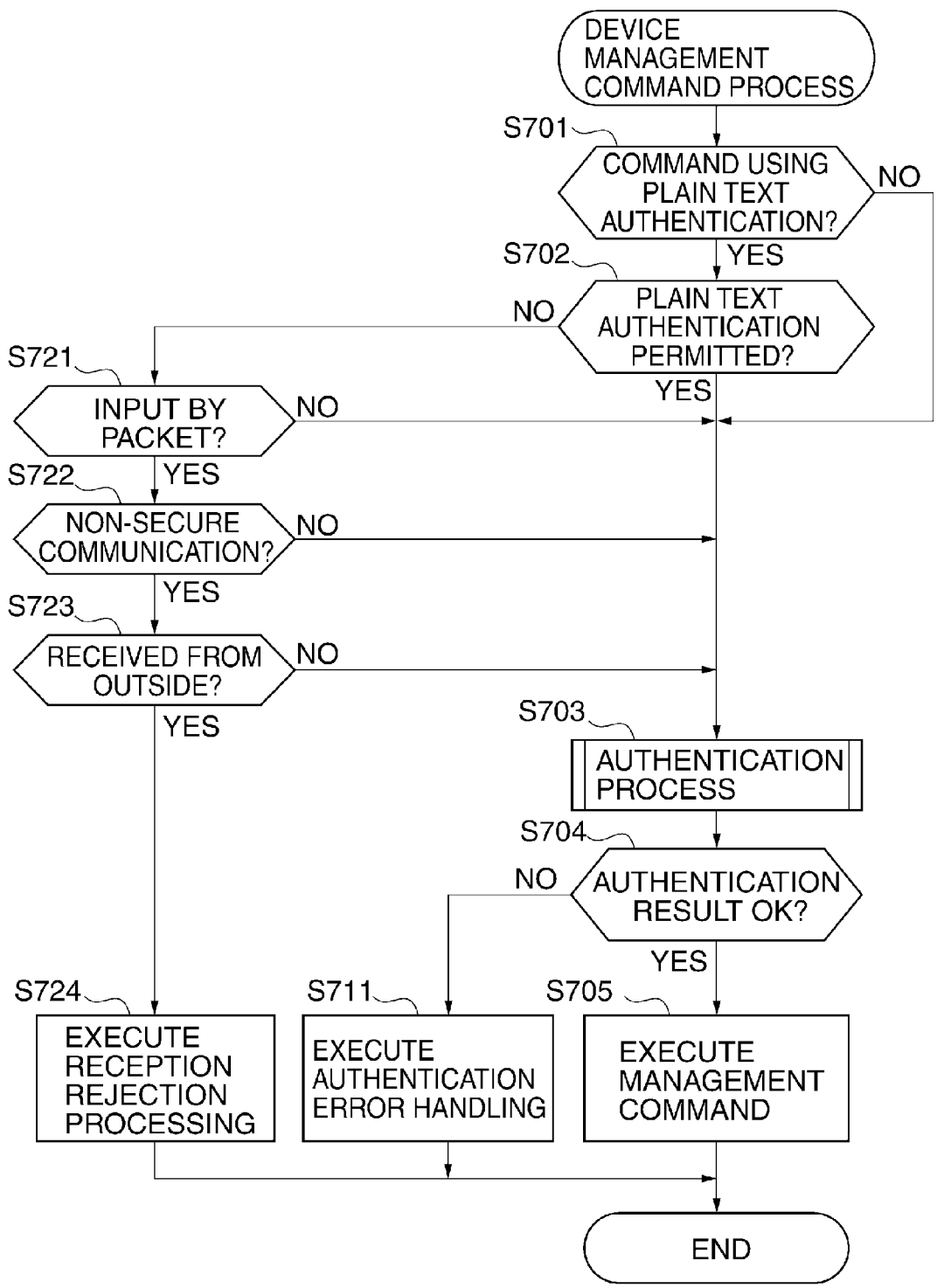
FIG. 6 is a flowchart of a device management command process executed by the CPU appearing in FIG. 2.

FIG. 6 is a flowchart of a device management command process executed by the CPU 201 appearing in FIG. 2.

Referring to FIG. 6, the CPU 201 determines whether or not a device management command received by the CPU 201 uses plain text authentication (step S701).

If it is determined in the step 701 that the received device management command does not use plain text authentication (NO to the step S701), the CPU 201 proceeds to a step S703, wherein the CPU 201 executes the authentication process. Thus, when a command is received which does not use plain text authentication, user authentication is performed.

On the other hand, if it is determined in the step S701 that the received device management command uses plain text authentication (YES to the step S701), the CPU 201 determines whether or not plain text authentication is permitted (step S702). This can be determined based on the setting described with reference to FIG. 3.

If it is determined in the step 702 that plain text authentication is permitted (YES to the step S702), the CPU 201 executes the authentication process (step S703), and determines whether or not the authentication result is OK (step S704).

If it is determined in the step 704 that the authentication result is OK (YES to the step S704), the CPU 201 executes the requested management command and notifies a sender of the command of the success of the device management command process (step S705), followed by terminating the present process.

On the other hand, if it is determined in the step 704 that the authentication result is not OK (NO to the step S704), this means that the authentication has failed, and hence the CPU 201 notifies, without executing the job, the sender of the command that the device management command process has failed due to an authentication error (step S711), followed by terminating the present process.

Referring again to the step S702, if it is determined in the step 702 that plain text authentication is not permitted (NO to the step S702), the CPU 201 determines whether or not the device management command has been received as a packet an example of which is shown in FIG. 4B (step S721).

If it is determined in the step 721 that the device management command has not been received as a packet (NO to the step S721), the CPU 201 proceeds to the step S703. Note that when the device management command has not been received as a packet, this means that the device management command has been issued by calling the above-mentioned internal API.

On the other hand, if it is determined in the step 721 that the device management command has been received as a packet (YES to the step S721), the CPU 201 determines whether or not the device management command has been received by non-secure communication (step S722). The non-secure communication refers to e.g. communication in which a communication path is not encrypted using SSL (Secure Socket Layer)/TLS (Transport Layer Security) or IPSec (Security Architecture for Internet Protocol).

If it is determined in the step 722 that the device management command has not been received by non-secure communication, in other words, has been received by secure communication (NO to the step S722), even when the authentication information shown in FIG. 5 is not a hash value or an encrypted value, the authentication information is concealed on the communication path, and hence the CPU 201 proceeds to the step S703. Thus, when a command has been received by secure communication, user authentication is performed.

On the other hand, if it is determined in the step 722 that the device management command has been received by non-secure communication (YES to the step S722), the CPU 201 determines whether or not the device management command has been transmitted from the outside of the MFP 101 and has been received via the network interface 209 (step S723).

If it is determined in the step 723 that the device management command has not been received from the outside of the MFP 101 (NO to the step S723), the CPU 201 proceeds to the step S703.

On the other hand, if it is determined in the step 723 that the device management command has been received from the outside of the MFP 101 (YES to the step S723), this means that the command using plain text authentication has been transmitted from the outside, and hence the CPU 201 executes the reception rejection processing (step S724), followed by terminating the present process.

The reception rejection processing refers to processing executed, as a response to the received job input command, for sending an error notification indicative of access rejection, handling the device management command as an error job, or executing the like processing, and then entering a history record of the device management command as an unauthorized access in the job history stored in the disk 208 of the MFP 101

In the step S601 in FIG. 5 and the step S702 in FIG. 6, described above, by storing a setting indicative of whether or not to permit plain text authentication in the server 103 connected via the network interface 209, the determination may be executed by inquiring the setting of the server 103 from the MFP 101.

Figure 7:
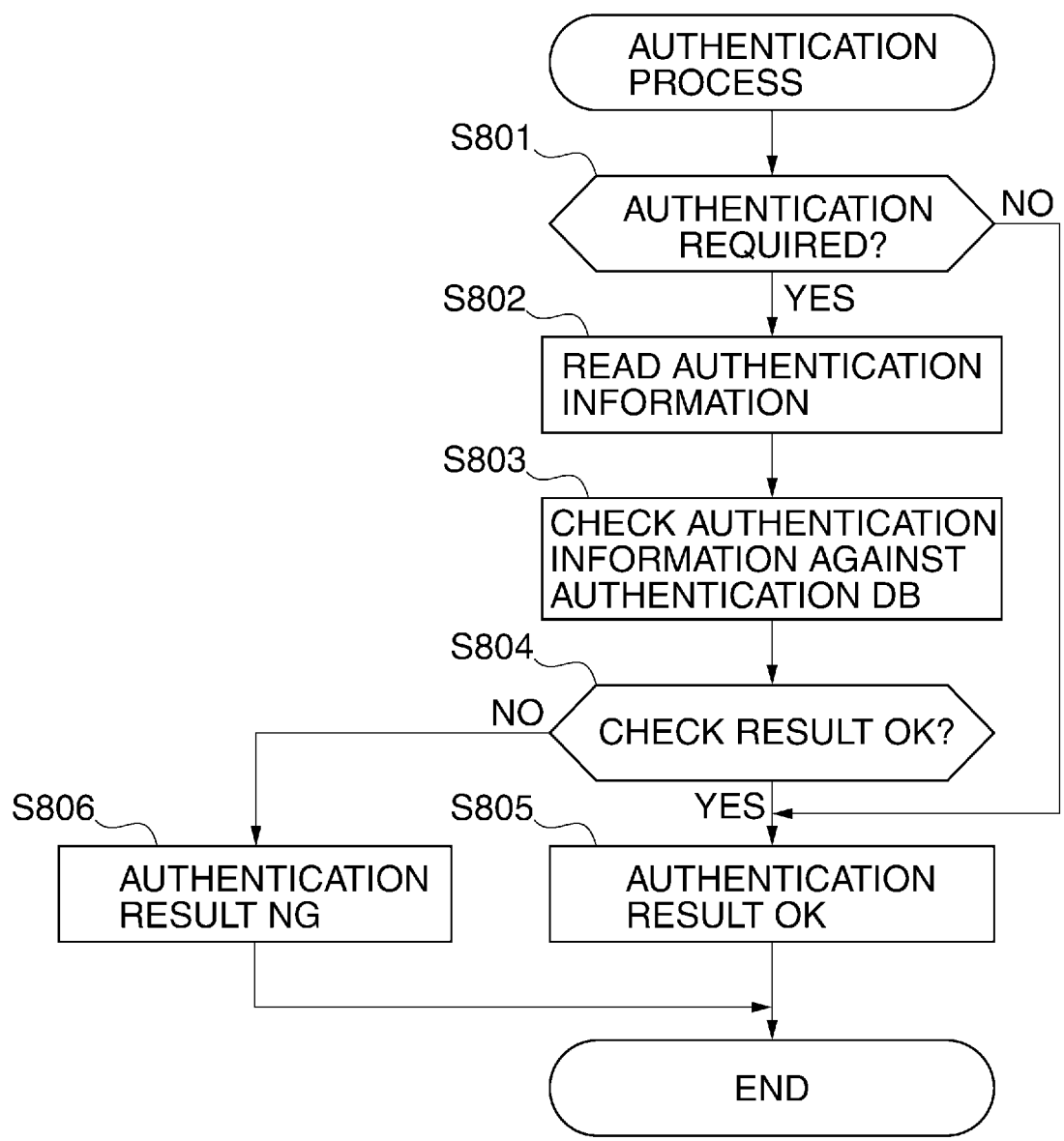
FIG. 7 is a flowchart of an authentication process executed in a step in FIG. 5 and a step in FIG. 6.

FIG. 7 is a flowchart of the authentication process executed in the step S602 in FIG. 5 and the step S703 in FIG. 6.

Referring to FIG. 7, the CPU 201 determines whether or not authentication is required (step S801). Whether or not authentication is required is determined according to whether or not a command to be processed requires authentication.

For example, the job input command requires section authentication or user authentication so as to perform account management and job management. Further, the device management command which involves a change of a setting of the MFP 101 requires user authentication so as to check whether or not the user has administrative authority.

If it is determined in the step 801 that authentication is not required (NO to the step S801), the CPU 201 proceeds to a step S805.

On the other hand, if it is determined in the step 801 that authentication is required (YES to the step S801), the CPU 201 reads authentication information from the received command (step S802). The CPU 201 reads e.g. User ID and Hash of Attribute 1 409 in FIG. 4A or User ID 506 and Password 507 in FIG. 4B according to the type and format of the command.

Then, the CPU 201 checks the read authentication information against authentication database information stored in the disk 208 in advance (step S803). Then, the CPU 201 determines whether or not the check result is OK (step S804).

If it is determined in the step 804 that the check result is OK (YES to the step S804), the CPU 201 returns a notification indicative of authentication result OK (step S805), followed by terminating the present process.

On the other hand, if it is determined in the step 804 that the check result is not OK (NO to the step S804), the CPU 201 returns a notification indicative of authentication result NG (step S806), followed by terminating the present process.

Note that the authentication database is not necessarily required to be stored in the MFP 101, but for example, the CPU 201 of the MFP 101 transmits authentication information read in the step S802 to the server 103 via the network interface 209, for the server 103 to perform authentication processing, and the determination in the next step S804 may be performed based on the authentication result received from the server 103.

In this case, the server 103 checks the authentication information transmitted from the MFP 101 and received via the network 110 against the authentication database DB which has been stored in the server 103 in advance, and transmits the check result to the MFP 101.

Note that in this case it is assumed that the authentication information is exchanged between the server 103 and the MFP 101 by concealing data on the communication path using SSL/TLS.

As described above, the MFP 101 can be configured to determine whether or not plain text authentication is permitted, and execute, if plain text authentication is not permitted, the reception rejection processing for a command using plain text authentication or a command received from the PC 102 by non-secure communication, without executing the authentication process, to thereafter notify a user of reception rejection.

As a result, it is possible to prevent authentication information to be concealed from flowing in plain text on a communication path.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-034814, filed Feb. 25, 2013, which is hereby incorporated by reference herein in its entirety.

What is claimed is:

1. An image forming apparatus comprising:
   a reception unit configured to receive data from an external apparatus via a network, the data including authentication information, the authentication information being written in plain text or hash;
   a setting unit configured to set a first mode or a second mode;
   a control unit configured to determine whether a user authentication should be performed;
   an authentication unit configured to authenticate a user on the basis of the authentication information obtained from the data, when the control unit determines that the user authentication should be performed; and
   a process unit configured to execute a process on the data on the basis of a result of the user authentication performed by the authentication unit,
   wherein the control unit determines, in a case where the first mode is set, whether the user authentication should be performed by the authentication unit, on the basis of whether the authentication information which is obtained from the data received by the reception unit is written in the plain text or the hash, and
   the control unit determines, in a case where the second mode is set, that the user authentication should be performed by the authentication unit, regardless whether the authentication information which is obtained from the data received by the reception unit is written in the plain text or the hash.

2. The image forming apparatus according to claim 1, wherein the process unit includes a printing unit configured to print an image on a sheet based on the data.

3. The image forming apparatus according to claim 1, wherein the process unit includes transmission unit configured to transmit an image by a facsimile based on the data.

4. The image forming apparatus according to claim 1, wherein the process unit includes reading unit configured to read an original based on the data.

5. The image forming apparatus according to claim 1, wherein the authentication information is a user ID or a user password.

6. The image forming apparatus according to claim 1, wherein in a case where the first mode is set, when the authentication information which is obtained from the data received by the reception is written in the plain text, the control unit determines whether the user authentication should be performed by the authentication unit, on the basis of whether a communication path of the data received by the reception unit is encrypted.

7. The image forming apparatus according to claim 6, wherein the communication path is encrypted by SSL.

8. A method of controlling an image forming apparatus wherein the image forming apparatus comprises:
   a reception unit configured to receive data from an external apparatus via a network, the data including authentication information, the authentication information being written in plain text or hash;
   a setting unit configured to set a first mode or a second mode;
   a control unit configured to determine whether a user authentication should be performed;
   an authentication unit configured to authenticate a user on the basis of the authentication information obtained from the data, when the control unit determines that the user authentication should be performed; and
   a process unit configured to execute a process on the data on the basis of a result of the user authentication performed by the authentication unit,
   wherein the control unit determines, in a case where the first mode is set, whether the user authentication should be performed by the authentication unit, on the basis of whether the authentication information which is obtained from the data received by the reception unit is written in the plain text or the hash, and
   the control unit determines, in a case where the second mode is set, that the user authentication should be performed by the authentication unit, regardless whether the authentication information which is obtained from the data received by the reception unit is written in the plain text or the hash;
   wherein the method comprises:
   receiving a command including authentication information via a network;
   determining whether or not the authentication information included in the command received by said receiving is a hash value; and
   causing, in a case where it is determined by said determining that the authentication information is a hash value, processing in accordance with the received command to be executed depending on authentication performed based on the authentication information, and causing, in a case where it is determined by said determining that the authentication information is not a hash value, the processing in accordance with the received command not to be executed.

9. A non-transitory computer-readable storage medium storing a computer-executable program for causing a computer to execute a method of controlling an image forming apparatus, wherein the image forming apparatus comprises:
   a reception unit configured to receive data from an external apparatus via a network, the data including authentication information, the authentication information being written in plain text or hash;
   a setting unit configured to set a first mode or a second mode;
   a control unit configured to determine whether a user authentication should be performed;
   an authentication unit configured to authenticate a user on the basis of the authentication information obtained from the data, when the control unit determines that the user authentication should be performed; and a process unit configured to execute a process on the data on the basis of a result of the user authentication performed by the authentication unit, wherein the control unit determines, in a case where the first mode is set, whether the user authentication should be performed by the authentication unit, on the basis of whether the authentication information which is obtained from the data received by the reception unit is written in the plain text or the hash, and the control unit determines, in a case where the second mode is set, that the user authentication should be performed by the authentication unit, regardless whether the authentication information which is obtained from the data received by the reception unit is written in the plain text or the hash;

wherein the method comprises:
  receiving a command including authentication information via a network;
  determining whether or not the authentication information included in the command received by said receiving is a hash value; and
  causing, in a case where it is determined by said determining that the authentication information is a hash value, processing in accordance with the received command to be executed depending on authentication performed based on the authentication information, and causing, in a case where it is determined by said determining that the authentication information is not a hash value, the processing in accordance with the received command not to be executed.

* * * * *